(12) United States Patent
Smith et al.

(10) Patent No.: US 11,981,085 B2
(45) Date of Patent: May 14, 2024

(54) MULTI-SOURCE OVERLAP DESIGN ACCEPTANCE QUALIFICATION

(71) Applicant: Raytheon Company, Waltham, MA (US)

(72) Inventors: Lisa M. Smith, Plano, TX (US); Nicholas C. Day, Tucson, AZ (US); Jacob H. Steinberg, Rosamond, CA (US)

(73) Assignee: Raytheon Company, Tewksbury, MA (US)

( * ) Notice: Subject to any disclaimer, the term of this patent is extended or adjusted under 35 U.S.C. 154(b) by 141 days.

(21) Appl. No.: 17/381,053

(22) Filed: Jul. 20, 2021

(65) Prior Publication Data
US 2023/0024156 A1   Jan. 26, 2023

(51) Int. Cl.
B29C 64/393 (2017.01)
B29C 64/153 (2017.01)
B29C 64/245 (2017.01)
B29C 64/40 (2017.01)
B33Y 10/00 (2015.01)
(Continued)

(52) U.S. Cl.
CPC .......... B29C 64/393 (2017.08); B29C 64/153 (2017.08); B29C 64/245 (2017.08); B29C 64/40 (2017.08); B33Y 10/00 (2014.12); B33Y 30/00 (2014.12); B33Y 50/02 (2014.12)

(58) Field of Classification Search
CPC ... B29C 64/393; B29C 64/153; B29C 64/245; B29C 64/40; B22F 10/30; B22F 10/31
See application file for complete search history.

(56) References Cited

U.S. PATENT DOCUMENTS

2017/0203517 A1  7/2017  Crear et al.
2018/0095450 A1* 4/2018  Lappas .................. G06T 19/00
2018/0281112 A1  10/2018  Roerig et al.
(Continued)

FOREIGN PATENT DOCUMENTS

JP   2019519760 A   7/2019
WO   2020231867 A1  11/2020

OTHER PUBLICATIONS

"Evaluation of Defects in Metal Laser Powder Bed Fusion (LPBF) Additive Manufacturing Using Multiple Layers", Project Summary, 2 pages, 3014, America Makes, NCDMM.
(Continued)

Primary Examiner — Katelyn W Smith
Assistant Examiner — John Robitaille

(57) ABSTRACT

A method includes controlling an additive manufacturing system to fabricate a 3D structure using successive layers of material. The additive manufacturing system includes a build platform having a first region, second region, and overlapping third region between the first and second regions; and multiple sources configured to build (e.g., deposit, bond, melt, solidify) the successive layers of material in the regions of the build platform. Controlling the additive manufacturing system includes controlling the additive manufacturing system to build first, second, and third portions of the 3D structure within the regions of the build platform. Each portion of the 3D structure includes (i) one or more test features that are common to the portions of the 3D structure and (ii) a substrate onto or into which the one or more common test features are formed.

21 Claims, 9 Drawing Sheets

(51) Int. Cl.
    *B33Y 30/00*         (2015.01)
    *B33Y 50/02*         (2015.01)

(56)            References Cited

U.S. PATENT DOCUMENTS

| | | |
|---|---|---|
| 2018/0345409 A1 | 12/2018 | Pavlov et al. |
| 2018/0361502 A1 | 12/2018 | Roerig et al. |
| 2019/0275613 A1 | 9/2019 | Etter et al. |
| 2020/0047288 A1 | 2/2020 | Schiffres et al. |
| 2021/0078076 A1 | 3/2021 | Jurg et al. |
| 2021/0140830 A1 | 5/2021 | Zhao et al. |

OTHER PUBLICATIONS

Moylan, et al., "An Additive Manufacturing Test Artifact", Journal of Research of the National Institute of Standards and Technology, Oct. 23, 2014, 31 pages, vol. 119, http://dx.doi.org/10.6028/jres.119.017.

International Search Report and Written Opinion of the International Searching Authority dated Apr. 4, 2022 in connection with International Patent Application No. PCT/US2021/062890, 12 pages.

\* cited by examiner

MULTI-SOURCE OVERLAP DESIGN ACCEPTANCE QUALIFICATION

TECHNICAL FIELD

This disclosure relates generally to additive manufacturing systems. More specifically, this disclosure relates to a multi-source (e.g. laser, nozzle) overlap design acceptance qualification.

BACKGROUND

Some three-dimensional (3D) printers or other additive manufacturing systems use multiple sources (typically lasers or nozzles) to provide increased productivity, such as to fabricate larger devices significantly faster compared to single source systems. An example of a multi-laser additive manufacturing system is a metal laser powder bed fusion (LPBF) system. The cost of an object manufactured by an additive manufacturing system is often strongly correlated to the print time, so faster additive manufacturing systems can result in cheaper costs.

SUMMARY

This disclosure provides a multi-source overlap design acceptance qualification.

In a first embodiment, a method includes controlling an additive manufacturing system to fabricate a three-dimensional (3D) structure using successive layers of material. The additive manufacturing system includes (i) a build platform having a first region, a second region, and an overlapping third region between the first and second regions; and (ii) multiple sources configured to build the successive layers of material in the first, second, and third regions of the build platform. Controlling the additive manufacturing system includes controlling the additive manufacturing system to build first, second, and third portions of the 3D structure respectively within the first, second, and third regions of the build platform. Each of the first, second, and third portions of the 3D structure includes (i) one or more test features that are common to the first, second, and third portions of the 3D structure and (ii) a substrate onto or into which the one or more common test features are formed.

In a second embodiment, an apparatus includes at least one processor configured to control an additive manufacturing system in order to fabricate a 3D structure using successive layers of material. The additive manufacturing system includes (i) a build platform having a first region, a second region, and an overlapping third region between the first and second regions; and (ii) multiple sources configured to build the successive layers of material in the first, second, and third regions of the build platform. To control the additive manufacturing system, the at least one processor is configured to cause the additive manufacturing system to build first, second, and third portions of the 3D structure respectively within the first, second, and third regions of the build platform such that each of the first, second, and third portions of the 3D structure includes (i) one or more test features that are common to the first, second, and third portions of the 3D structure and (ii) a substrate onto or into which the one or more common test features are formed.

In a third embodiment, a non-transitory computer-readable medium contains instructions that when executed cause at least one processor to control an additive manufacturing system in order to fabricate a 3D structure using successive layers of material. The additive manufacturing system includes (i) a build platform having a first region, a second region, and an overlapping third region between the first and second regions; and (ii) multiple sources configured to build the successive layers of material in the first, second, and third regions of the build platform. The instructions that cause the at least one processor to control the additive manufacturing system comprise instructions that cause the at least one processor to cause the additive manufacturing system to build first, second, and third portions of the 3D structure respectively within the first, second, and third regions of the build platform such that each of the first, second, and third portions of the 3D structure includes (i) one or more test features that are common to the first, second, and third portions of the 3D structure and (ii) a substrate onto or into which the one or more common test features are formed.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
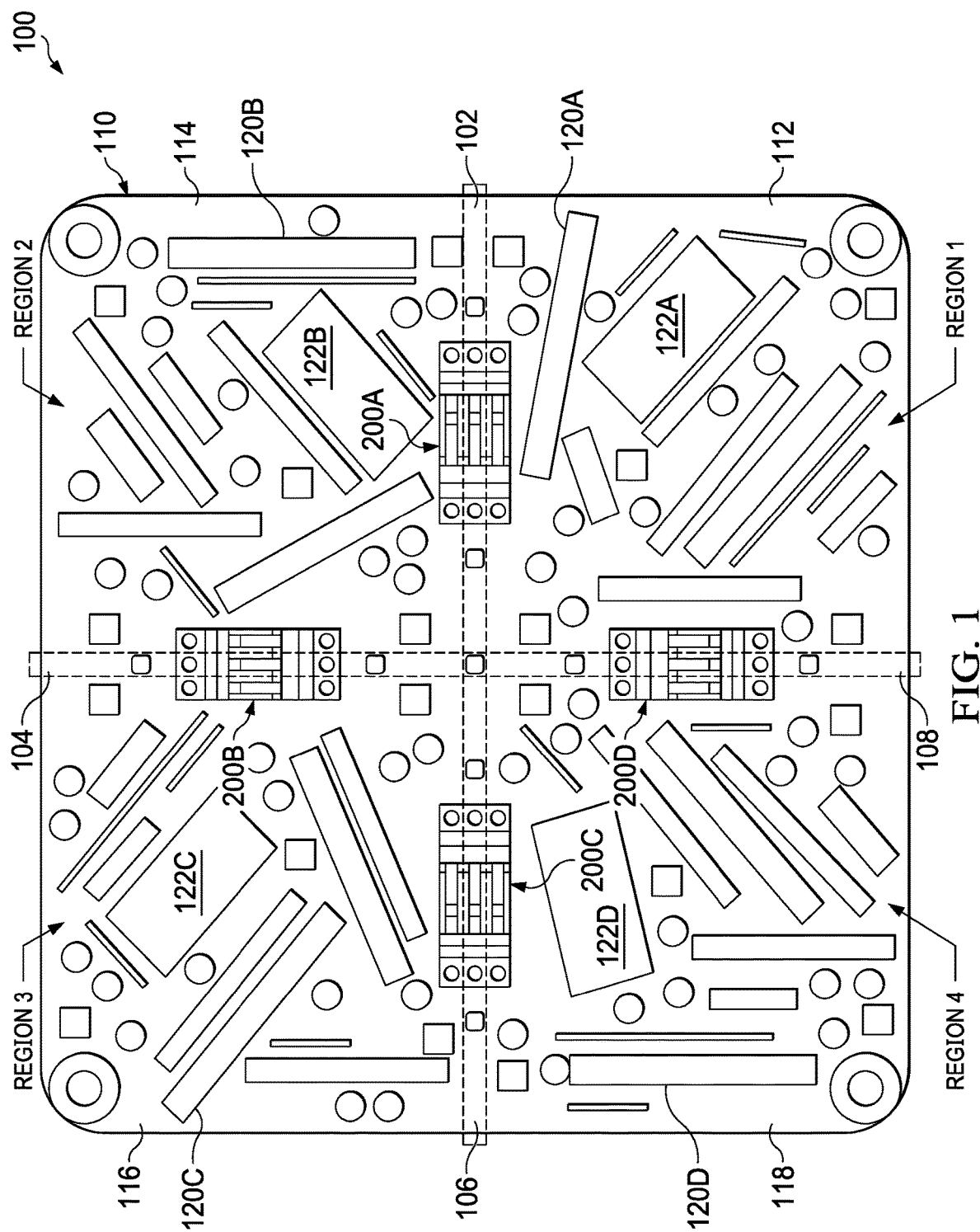
FIG. 1 illustrates an example additive manufacturing system according to this disclosure.

FIGS. 1 through 9, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As described above, some three-dimensional (3D) printers or other additive manufacturing systems use multiple sources to provide increased productivity, such as to fabricate larger devices significantly faster compared to single-source systems. An example of a multi-source additive manufacturing system is a metal laser powder bed fusion (LPBF) system with multiple lasers. The cost of an object manufactured by an additive manufacturing system is often strongly correlated to the print time, so faster additive manufacturing systems can result in cheaper costs.

A "non-full-field overlap" type of multi-source additive manufacturing system uses different sources to form different portions of a device, and an overlap region can be defined where the sources overlap within the additive manufacturing system. Unfortunately, the overlapping sources may not be perfectly aligned or have equivalent capabilities. In some cases, defects or other issues are observed in fabricated features formed within these overlap regions. These defects can be critical in various circumstances, such as when dealing with internal channels, lattice structures, or tolerance requirements. Acceptance qualification for these types of additive manufacturing systems can therefore be more difficult compared to single-source systems. While many manufacturers sell commercially-available multi-source additive manufacturing systems, there is still a challenge in understanding potential defects that can arise from the use of these multi-source systems.

This disclosure describes techniques for forming multi-source overlap design acceptance qualification (MSODAQ) parts, which can be used for calibration and validation of a multi-source additive manufacturing system. Among other things, the MSODAQ parts may allow engineers, designers, or other personnel to understand how a multi-laser additive manufacturing system can function within one or more overlap regions (where two or more lasers can overlap). Based on this knowledge, the engineers, designers, or other personnel may control how devices are fabricated using the multi-laser additive manufacturing system, such as by allowing fabrication of some elements of the devices in one or more overlap regions within the additive manufacturing system while limiting fabrication of other elements of the devices to non-overlap regions within the additive manufacturing system. As a result, this can help to reduce or avoid future fabrication failures, defects, or other issues that result from inadequate understanding of the capabilities of the additive manufacturing system). Ideally, this helps to increase the quantity and quality of the fabricated devices and reduce the costs of the fabricated devices.

FIG. 1 illustrates an example additive manufacturing system 100 according to this disclosure. As shown in FIG. 1, the additive manufacturing system 100 includes a build platform 110, which represents a platform on which devices can be additively manufactured. The build platform 110 in this example includes four overlap regions 102, 104, 106, and 108, which represent areas where different lasers (i.e., sources) of the additive manufacturing system 100 can overlap. The build platform 110 also includes various regions 112, 114, 116, and 118 in which lasers and other components of the additive manufacturing system 100 can be used to fabricate devices (or portions of devices). The lasers and other components of the additive manufacturing system 100 can be used to fabricate structures 120A-120D, 122A-122D completely within individual regions 112, 114, 116, 118 of the additive manufacturing system 100. The lasers and other components of the additive manufacturing system 100 can also be used to fabricate structures that span multiple regions 112, 114, 116, 118 of the additive manufacturing system 100. In those cases, the structures will extend between at least two of the regions 112, 114, 116, 118 and pass through one or more of the overlap regions 102, 104, 106, and 108.

In order to determine the characteristics of how the sources and other components of the additive manufacturing system 100 operate within the overlap regions 102, 104, 106, and 108, the additive manufacturing system 100 can be controlled to build MSODAQ parts 200A-200D. Each MSODAQ part 200A-200D here can be fabricated partially inside and partially outside one of the overlap regions 102, 104, 106, and 108. As described in more detail below, each MSODAQ part 200A-200D can be formed at least within first and second non-overlapping regions of the build platform 110 and a third overlapping region of the build platform 110. Each MSODAQ part 200A-200D includes various test features that are fabricated in the overlapping and non-overlapping regions of the build platform 110, and the MSODAQ part 200A-200D can be examined after fabrication in order to identify how the additive manufacturing system 100 performed in building the various test features in the different overlapping and non-overlapping regions.

This allows manual or automated determinations to be made regarding how additional devices should be fabricated using the additive manufacturing system 100. For example, if a test feature can be adequately fabricated in both overlapping and non-overlapping regions of the additive manufacturing system 100, devices can be fabricated with the same or similar features in any overlapping and non-overlapping regions of the additive manufacturing system 100. If a test feature cannot be adequately fabricated in an overlapping region of the additive manufacturing system 100, devices can be fabricated with the same or similar features formed only within non-overlapping regions of the additive manufacturing system 100.

Although FIG. 1 illustrates one example of an additive manufacturing system 100, various changes may be made to FIG. 1. For example, various components in FIG. 1 may be combined, further subdivided, replicated, omitted, or rearranged and additional components may be added according to particular needs. As a particular example, the additive manufacturing system 100 here includes four regions 112, 114, 116, and 118 and four overlap regions 102, 104, 106, and 108. Other additive manufacturing systems 100 may include other numbers of overlapping and non-overlapping regions, including two non-overlapping regions and a single overlapping region.

Figure 2A:
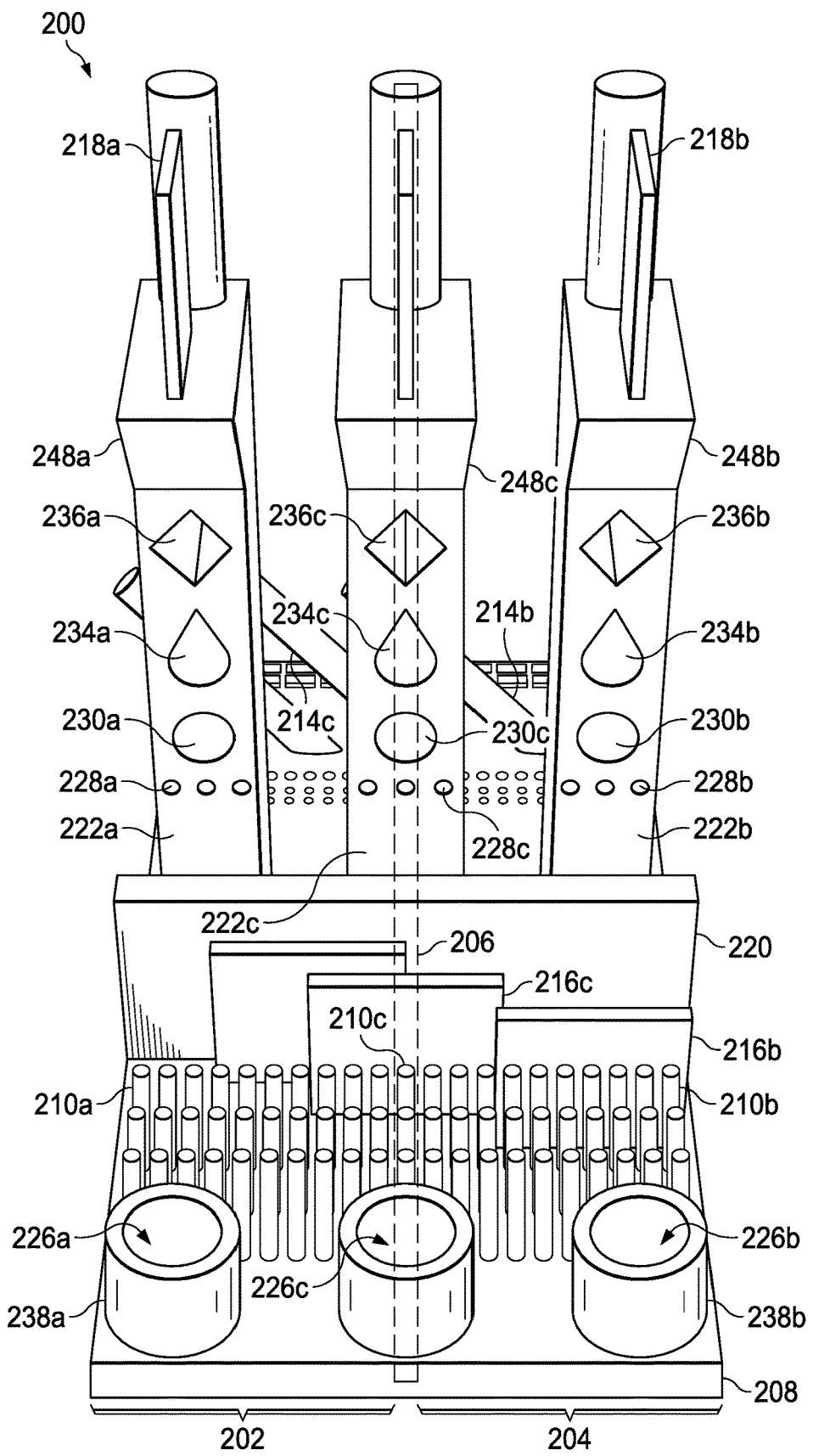
FIGS. 2A through 2D illustrate an example multi-source overlap design acceptance qualification (MSODAQ) part according to this disclosure.
Figure 2B:
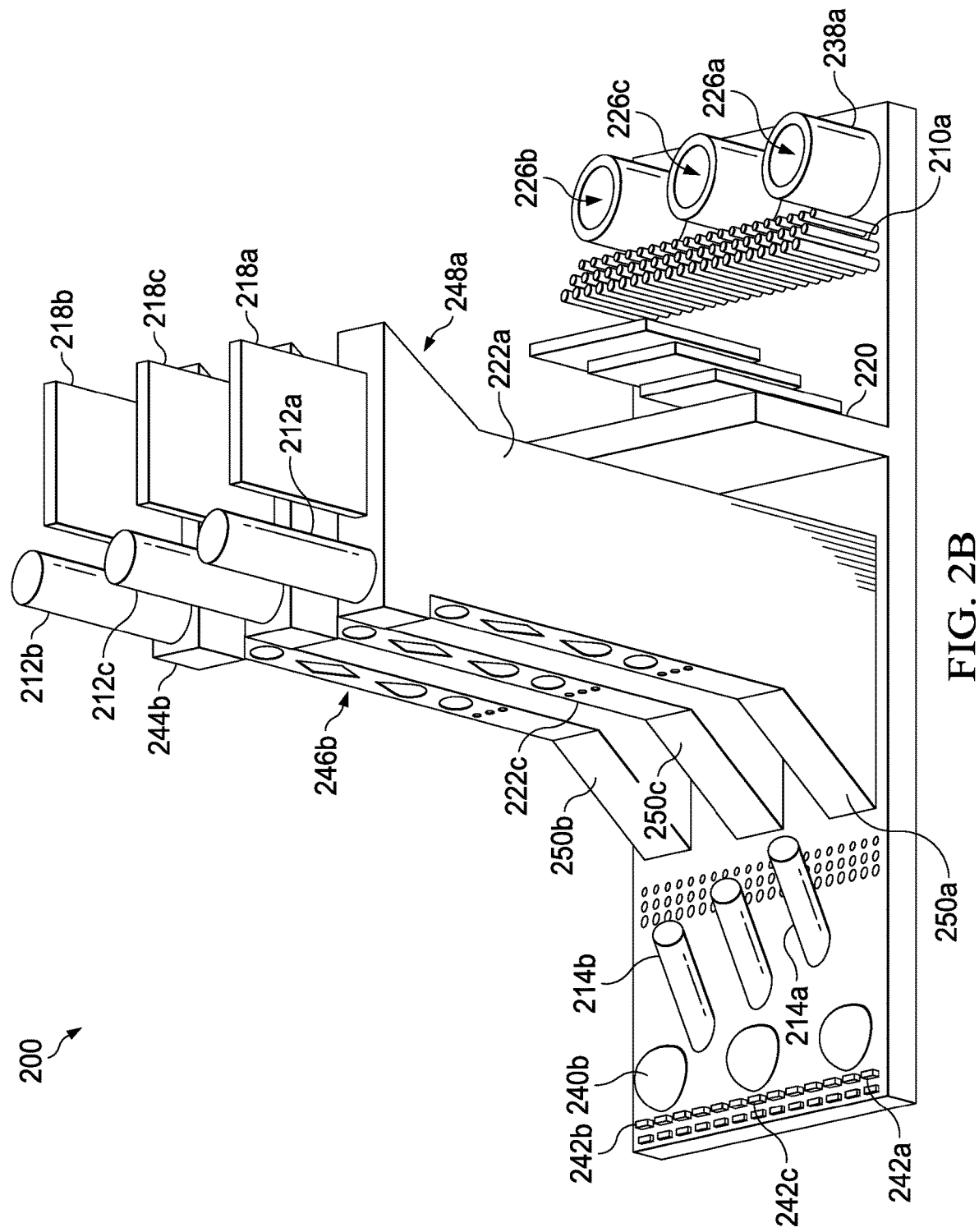
Figure 2C:
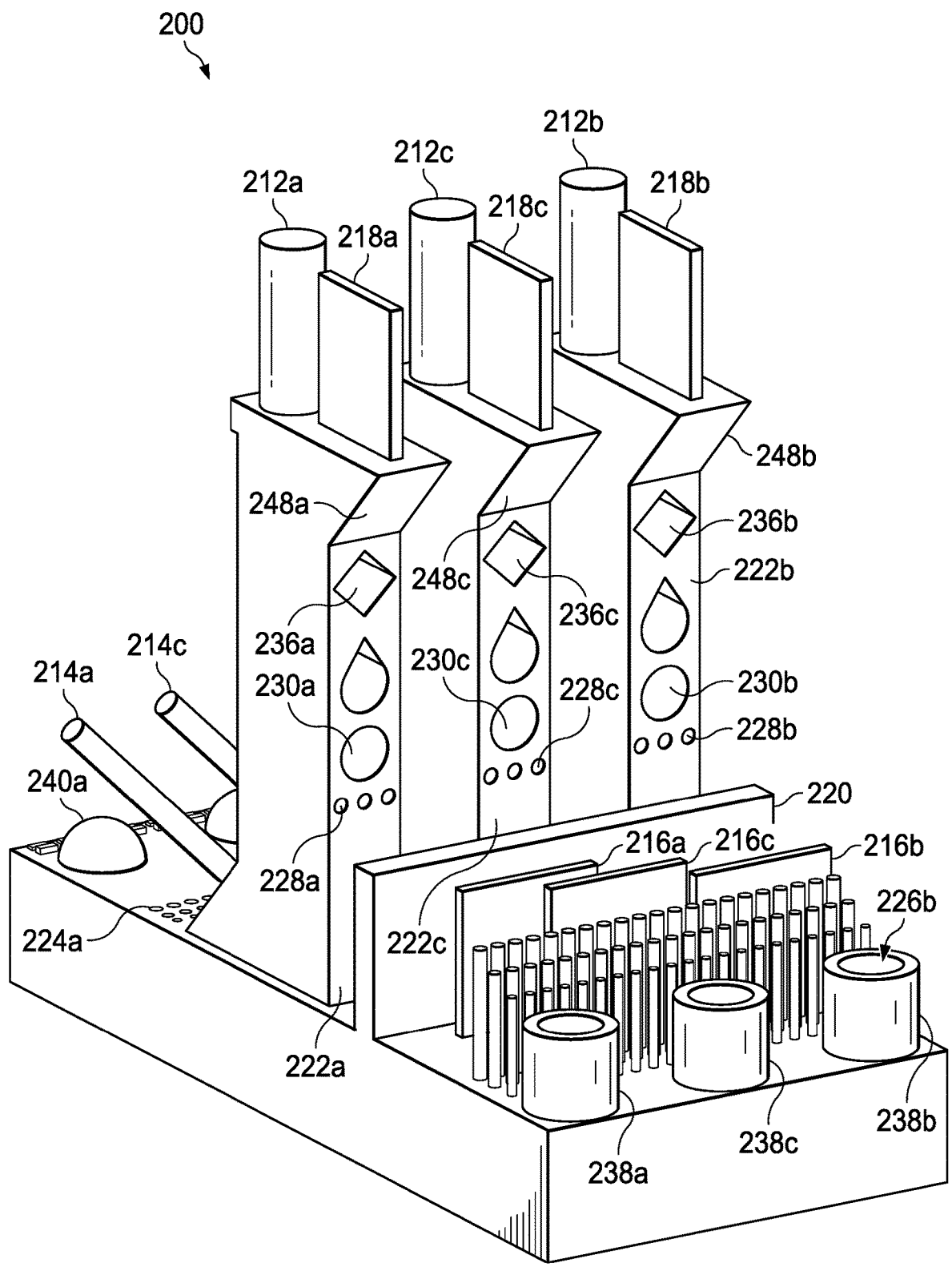
Figure 2D:
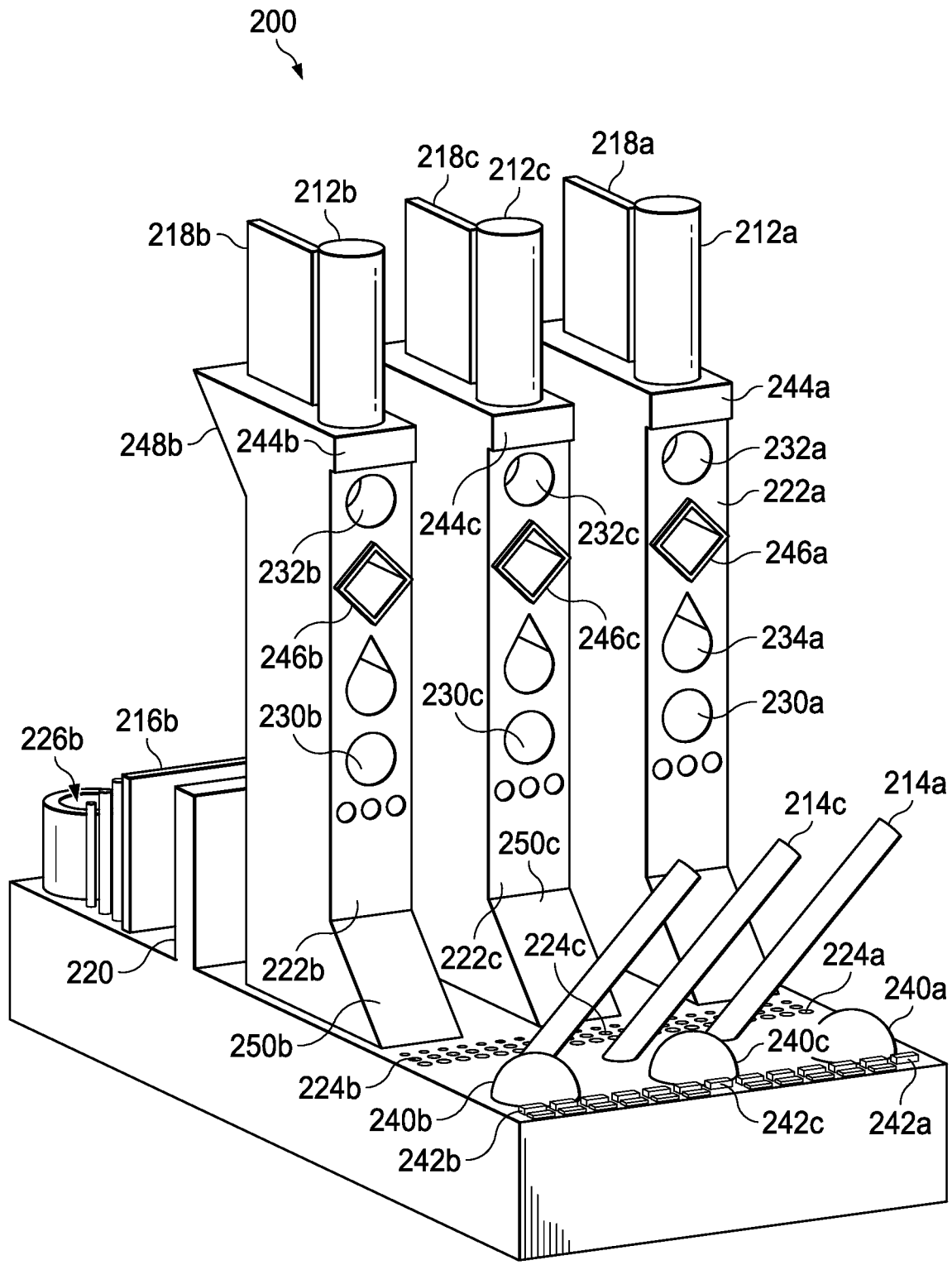

FIGS. 2A through 2D illustrate an example MSODAQ part 200 according to this disclosure. More specifically, FIG. 2A illustrates a front view of the MSODAQ part 200, FIG. 2B illustrates a side view of the MSODAQ part 200, FIG. 2C illustrates a front perspective view of the MSODAQ part 200, and FIG. 2D illustrates a rear perspective view of the MSODAQ part 200. The MSODAQ part 200 here may represent any of the MSODAQ parts 200A-200D shown in FIG. 1. For ease of explanation, the MSODAQ part 200 is described as being formed using the additive manufacturing system 100 of FIG. 1. However, the MSODAQ part 200 may be fabricated using any other suitable additive manufacturing system.

As shown in FIGS. 2A through 2D, the MSODAQ part 200 represents a structure having a first portion 202 built using a first source (such as entirely within one region 112, 114, 116, 118 of the build platform 110) and a second portion 204 built using a second source (such as entirely within another region 112, 114, 116, 118 of the build platform 110). The structure also has a third portion 206 built using the first source and the second source within an overlapping region of the additive manufacturing system 100 (such as within one of the overlap regions 102, 104, 106, 108 of the build platform 110).

The structure of the MSODAQ part 200 here includes a substrate 208, which functions as a bottom base and supports other components of the MSODAQ part 200. The substrate 208 here spans the length and width of the MSODAQ part 200, so each of the first, second, and third portions 202, 204, 206 of the MSODAQ part 200 includes part of the substrate 208. In this particular example, the substrate 208 has a rectangular shape, although other shapes may be used.

The MSODAQ part 200 also includes various types of test features that are built onto and/or into the substrate 208. Each test feature may be present in all three portions 202, 204, 206 of the MSODAQ part 200, meaning each test feature can be common to all portions 202, 204, 206 of the MSODAQ part 200. This allows an inspection of the MSODAQ part 200 to occur and a determination to be made regarding how well the different sources (e.g., laser heads; nozzles) of the additive manufacturing system 100 can fabricate these test features. Among other things, this may provide engineers or other personnel with a side-by-side comparison of characteristics of the test features (such as quality, resolution, number of defects, dimensions, etc.) when built using overlapping and non-overlapping sources.

Note that the third portion 206 here is much narrower compared to the first and second portions 202 and 204. In other cases, the third portion 206 may be wider. However, in the example shown in FIGS. 2A through 2D, the third portion 206 may have a width that is much smaller than at least some of the test features fabricated in the MSODAQ part 200. This is still useful since it can be used to determine whether parts of features in the first portion 202 can be joined with other parts of the same features in the second portion 204. Also note that various types of structural components may be used as the test features of the MSODAQ part 200. In some cases, the structural components used as the test features may be based (at least in part) on the structural components of the devices to be fabricated by the additive manufacturing system 100. In other cases, the structural components used as the test features may be selected to provide a broad understanding of how the additive manufacturing system 100 operates.

As shown in this example, the test features fabricated in the MSODAQ part 200 may include one or more types of pins, such as thinner vertical pins 210a-210c, thicker vertical pins 212a-212c, and thicker acute-angled pins 214a-214c. The test features fabricated in the MSODAQ part 200 may also include one or more types of walls, such as thinner horizontal walls 216a-216c that overlap or stop at a boundary of a source, thinner vertical walls 218a-218c, thicker horizontal walls 220, and thicker vertical walls 222a-222c. The test features fabricated in the MSODAQ part 200 may further include one or more types of openings or holes, such as smaller vertical holes 224a-224c, larger vertical holes 226a-226c, smaller horizontal holes 228a-228c, larger horizontal holes 230a-230c, blind horizontal holes 232a-232c, teardrop horizontal holes 234a-234c, and diamond horizontal holes 236a-236c. The test features fabricated in the MSODAQ part 200 may also include one or more types of 3D structures, such as concentric cylinders 238a-238c; semi-spheres 240a-240c; dots or small steps 242a-242c; overhangs like boss overhangs 244a-244c, diamond-point overhangs 246a-246c, and acute-angled downskin overhangs 248a-248c; and acute-angled upskin surfaces 250a-250c. Note that these test features are for illustration only and that the MSODAQ part 200 may include any suitable combination of these test features (with or without additional test features) as needed or desired.

Although FIGS. 2A through 2D illustrate one example of a MSODAQ part 200, various changes may be made to FIGS. 2A through 2D. For example, various components in FIGS. 2A through 2D may be combined, further subdivided, replicated, omitted, or rearranged and additional components may be added according to particular needs. Also, each of the test features here may have any suitable size, shape, and dimensions, and angled test features may have any desired angle.

Figure 3:
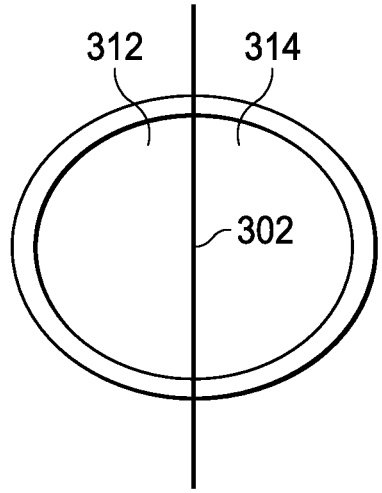
FIG. 3 illustrates an example straight overlap region according to this disclosure.
Figure 4:
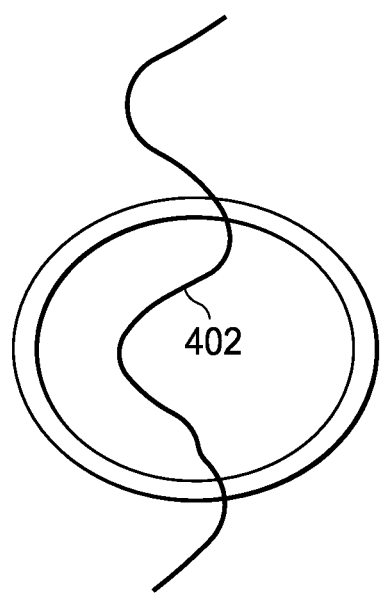
FIG. 4 illustrates an example sinusoidal overlap region according to this disclosure.

FIG. 3 illustrates an example straight overlap region 302 according to this disclosure, and FIG. 4 illustrates an example sinusoidal overlap region 402 according to this disclosure. As shown in FIG. 3, the overlap region 302 indicates that two sources may be used to form portions 312 and 314 of a feature (a hole in this example), where these portions 312 and 314 have a straight border. As shown in FIG. 4, the overlap region 402 indicates that two sources may be used to form portions of a feature (a hole in this example), where these portions have a sinusoidal or other non-linear border. In general, a test feature of the MSODAQ part 200 or a feature of a device being fabricated by the additive manufacturing system 100, if formed at least partially in an overlapping region of multiple sources, can be fabricated with a linear or non-linear boundary, continuous or non-continuous.

Although FIG. 3 illustrates one example of a straight overlap region 302 and FIG. 4 illustrates one example of a sinusoidal overlap region 402, various changes may be made to FIGS. 3 and 4. For example, other types of boundaries may exist for an overlap region, such as a sawtooth form. As another example, the overlap region can be a full area overlap (also referred to as "full-field overlap").

Figure 5A:
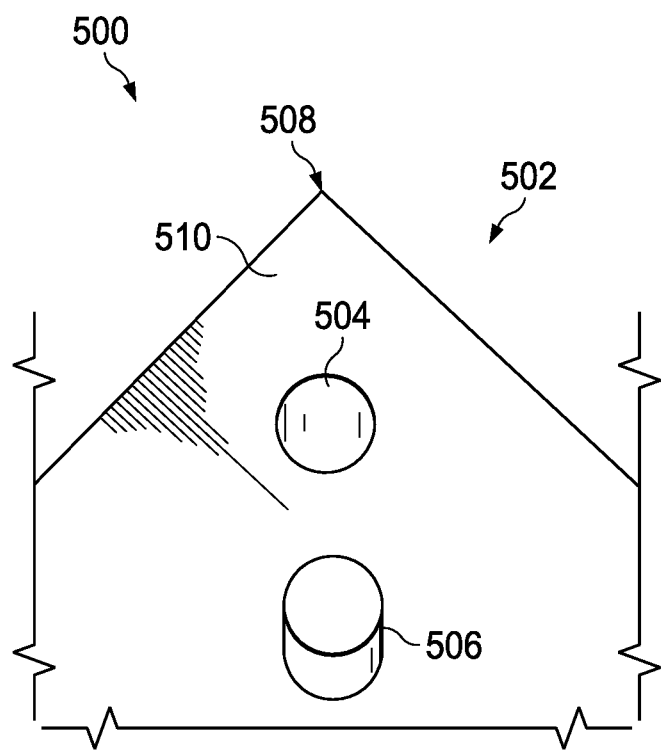
FIGS. 5A and 5B illustrate example test features manufactured within a non-overlap region of an additive manufacturing system according to this disclosure.
Figure 5B:
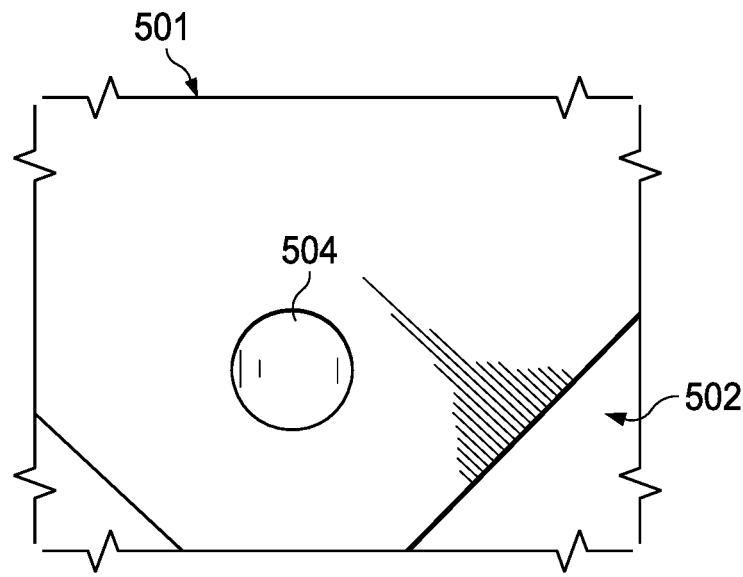
Figure 6A:
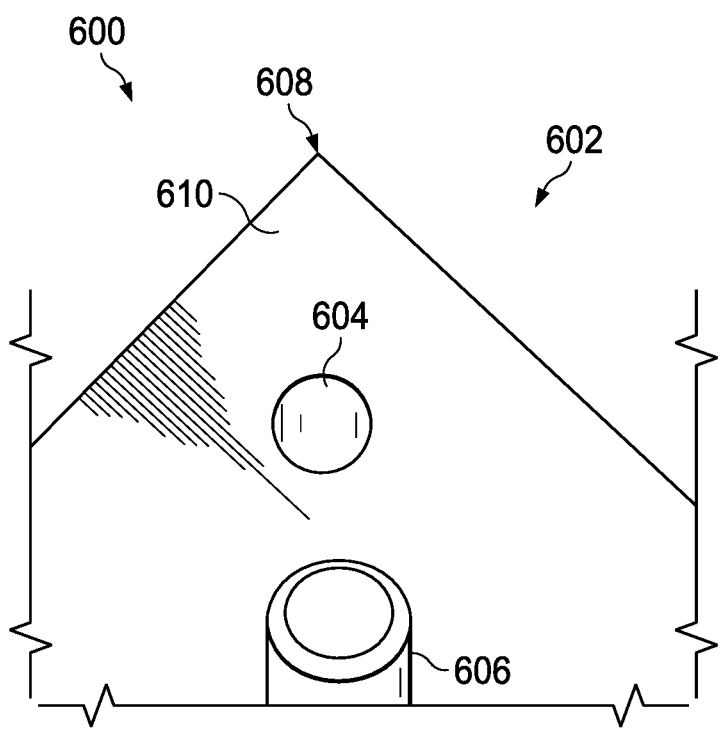
FIGS. 6A and 6B illustrate example test features manufactured within an overlap region of an additive manufacturing system according to this disclosure.
Figure 6B:
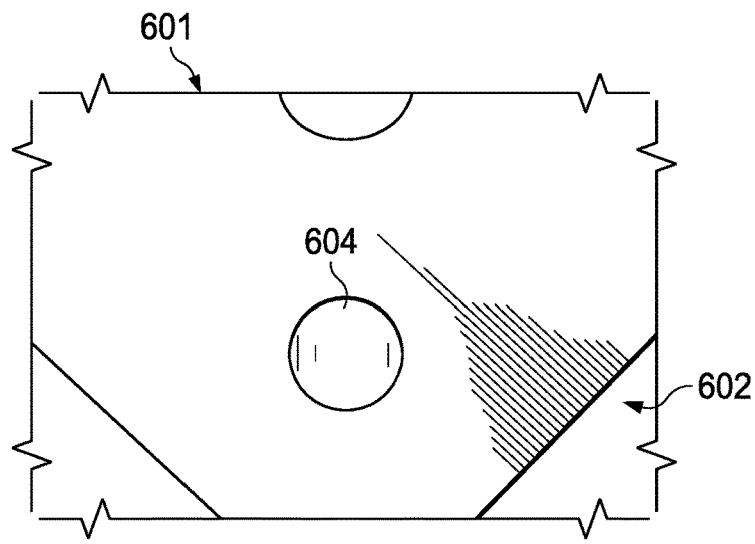

FIGS. 5A and 5B illustrate example test features manufactured within a non-overlap region of an additive manufacturing system according to this disclosure, and FIGS. 6A and 6B illustrate example test features manufactured within an overlap region of an additive manufacturing system according to this disclosure. More specifically, FIGS. 5A and 5B contain photographs 500 and 501 of top and bottom views of a vertical hole 504 within a MSODAQ part 502, and FIGS. 6A and 6B contain photographs 600 and 601 of top and bottom views of a vertical hole 604 within a MSODAQ part 602 (which may be the MSODAQ part 502).

Source overlap in a multi-source system can impact feature printability compared to single-source systems, and this can depend on the alignment capabilities of the multi-source system. Using a MSODAQ part to characterize the behavior of a multi-source system can help to identify which features may or may not be fabricated effectively in source overlapping regions. In the example MSODAQ parts 502 and 602 shown here, the holes 504, 604 have similar qualities on top and bottom, regardless of whether the holes 504, 604 are formed using one or multiple sources. Here, both holes 504 and 604 are visibly smooth, and this observation may indicate to an engineer or other personnel that vertical holes can be fabricated with suitable quality in both overlapping and non-overlapping regions.

These examples may also include that some test features, such as a vertical pin 506, 606, a corner 508, 608, or a substrate 510, 610, can have a higher quality and fewer defects when fabricated using a single source in a non-overlapping region compared to being fabricated using multiple sources. For example, the sharp vertex of the corner 508 in FIG. 5A has a higher quality than the rounded vertex of the corner 608 in FIG. 5B, which includes a blob or other defect. Also, the substrate 510 has a flatter surface compared to the substrate 610, which has an uneven surface with raised and sunken areas. These observations may indicate to an engineer or other personnel that these components should not be printed in any overlapping regions.

Although FIGS. 5A and 5B illustrate one example of test features manufactured within a non-overlap region and FIGS. 6A and 6B illustrate one example of test features manufactured within an overlap region of an additive manufacturing system, various changes may be made to FIGS. 5A through 6B. For example, the results shown here are merely meant to illustrate one example of how the described MSODAQ parts may be used.

Figure 7:
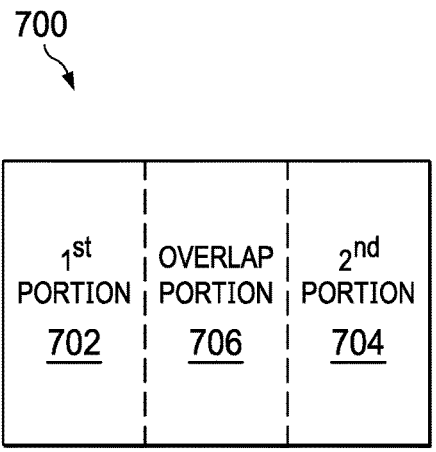
FIGS. 7 and 8 illustrate example techniques for additively forming a MSODAQ part according to this disclosure.
Figure 8:
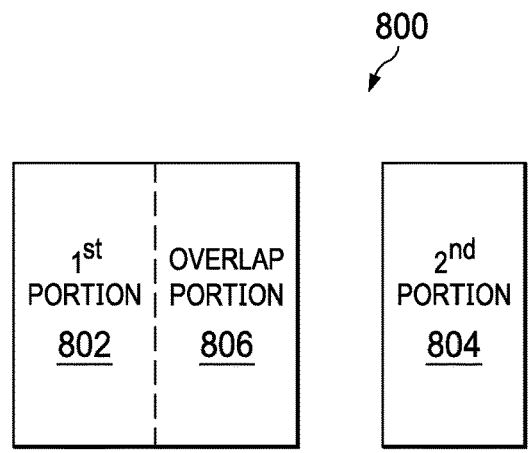

FIGS. 7 and 8 illustrate example techniques for additively forming a MSODAQ part according to this disclosure. Either of these techniques (or any other suitable technique) may be used to fabricate the MSODAQ part(s) 200, 200A-200D described above.

As shown in FIG. 7, a MSODAQ part 700 may be additively manufactured as a unitary structure across first, second, and overlap (third) regions of a build platform (such as the build platform 110). Here, the MSODAQ part 700 includes a first portion 702 formed in the first region of the build platform, a second portion 704 formed in the second region of the build platform, and an overlap (third) portion 706 formed in the third region of the build platform. In the example shown here, the MSODAQ part 700 and each of its portions 702, 704, 706 has a rectangular perimeter, although this is for illustration only and can vary as needed or desired.

As shown in FIG. 8, a MSODAQ part 800 may be additively manufactured as multiple structures, such as when one structure is additively manufactured across first and overlap (third) regions of a build platform (such as the build platform 110) and another discrete structure is additively manufactured in a second region of the build platform. Here, the MSODAQ part 800 includes a first portion 802 formed in the first region of the build platform, which can be integral with an overlap (third) portion 806 formed in the third region of the build platform. The MSODAQ part 800 also includes a second portion 804 formed in the second region of the build platform, which can fit together with the third portion 806 (such as to form a seam). Again, in the example shown here, the MSODAQ part 800 and each of its portions 802, 804, 806 has a rectangular perimeter, although this is for illustration only and can vary as needed or desired.

Although FIGS. 7 and 8 illustrate examples of techniques for additively forming a MSODAQ part, various changes may be made to FIGS. 7 and 8. For example, a MSODAQ part may be formed integrally or using discrete components in any other suitable manner.

Figure 9:
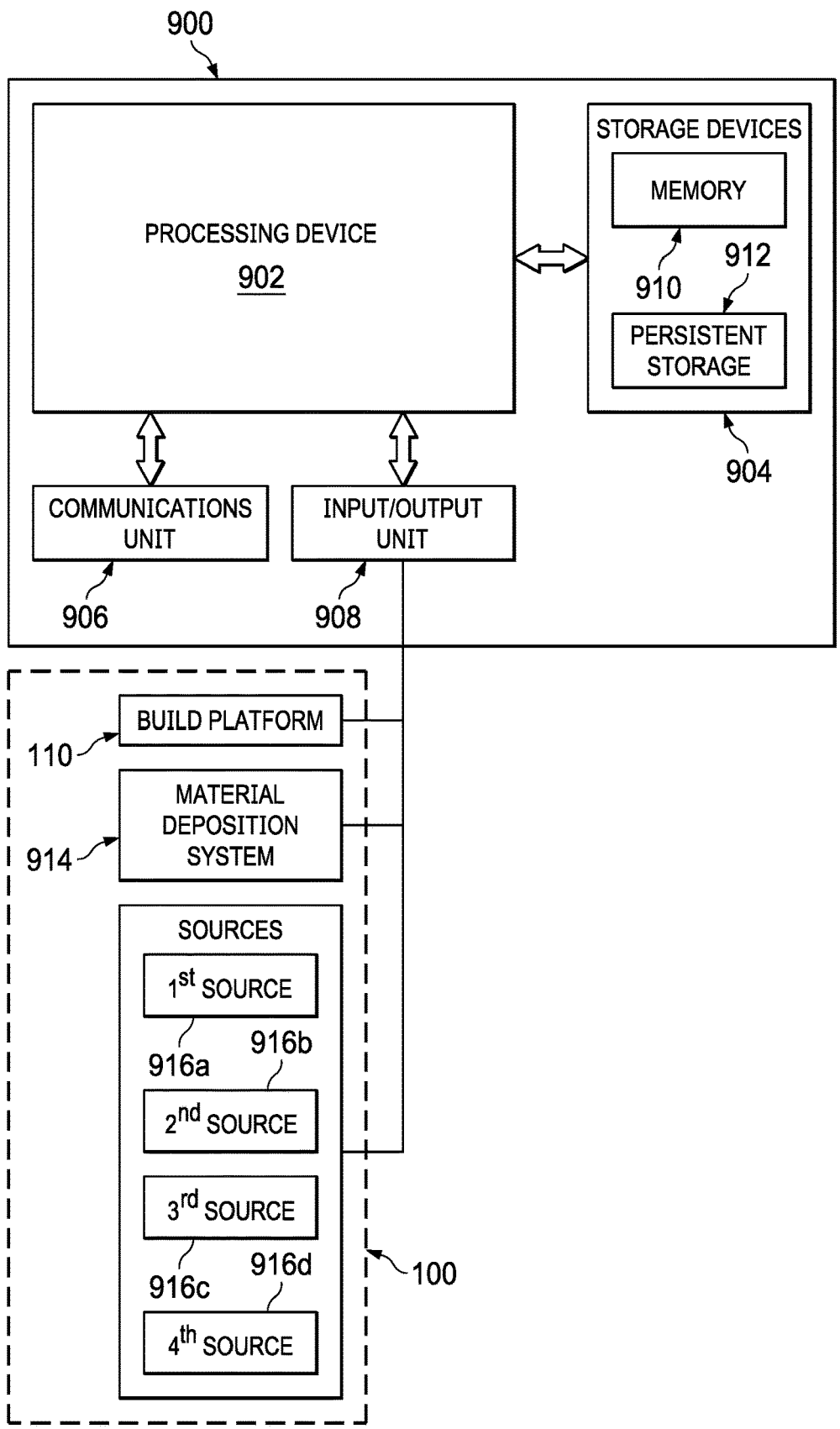
FIG. 9 illustrates an example device supporting additive manufacturing of a MSODAQ part according to this disclosure.

FIG. 9 illustrates an example device 900 supporting additive manufacturing of a MSODAQ part according to this disclosure. The device 900 may, for example, be used to interact with and control operation of the additive manufacturing system 100. As shown in FIG. 9, the device 900 may include at least one processing device 902, at least one storage device 904, at least one communications unit 906, and at least one input/output (I/O) unit 908. The processing device 902 may execute instructions that can be loaded into a memory 910. The processing device 902 includes any suitable number(s) and type(s) of processors or other processing devices in any suitable arrangement. Example types of processing devices 902 include one or more microprocessors, microcontrollers, digital signal processors (DSPs), application specific integrated circuits (ASICs), field programmable gate arrays (FPGAs), or discrete circuitry.

The memory 910 and a persistent storage 912 are examples of storage devices 904, which represent any structure(s) capable of storing and facilitating retrieval of information (such as data, program code, and/or other suitable information on a temporary or permanent basis). The memory 910 may represent a random access memory or any other suitable volatile or non-volatile storage device(s). The persistent storage 912 may contain one or more components or devices supporting longer-term storage of data, such as a read only memory, hard drive, Flash memory, or optical disc.

The communications unit 906 supports communications with other systems or devices. For example, the communications unit 906 may support communications with external systems that provide information to the device 900 for use in fabricating different products. The communications unit 906 may support communications through any suitable physical or wireless communication link(s), such as a network or dedicated connection(s).

The I/O unit 908 allows for input and output of data. For example, the I/O unit 908 may provide a connection for user input through a keyboard, mouse, keypad, touchscreen, or other suitable input device. The I/O unit 908 may also send output to a display or other suitable output device. The I/O unit 908 can further support communications with various components of the additive manufacturing system 100.

In this example, the additive manufacturing system 100 includes the build platform 110, at least one material deposition system 914, and multiple sources 916a-916d. Each material deposition system 914 is configured to deposit successive layers of material onto or over at least one specified area of the build platform 110. In certain embodiments, the layers of material are heated by the sources 916a-916d (e.g., lasers) to fabricate MSODAQ parts or other products. Each material deposition system 914 includes any suitable structure configured to deposit material used to additively form one or more products. Each source 916a-916d includes any suitable structure configured to generate energy that melts or other processes the deposited material. In certain embodiments, such as when the additive manufacturing system 100 is an LPBF system, the material deposition system 914 can be a powder system that uses a recoater blade to distribute powder. In certain embodiments, such as when the additive manufacturing system 100 is a Fused Filament Fabrication (FFF) additive manufacturing system, the material deposition system 914 includes multiple nozzles that extrude material through a "material deposition head."

Although FIG. 9 illustrates one example of a device 900 supporting additive manufacturing of a MSODAQ part, various changes may be made to FIG. 9. For example, computing devices and systems come in a wide variety of configurations, and FIG. 9 does not limit this disclosure to any particular computing or communication device or system. Also, four sources 916a-916d are shown here and may correspond to the four regions 112, 114, 116, 118 of the additive manufacturing system 100. However, the additive manufacturing system 100 may include any suitable number of lasers, such as two lasers associated with two regions of an additive manufacturing system. In certain embodiments, the additive manufacturing system 100 may include multiple material deposition nozzles instead of laser heads. That is, in certain embodiments, the multiple sources 916a-916d can deposit, bond, melt, and/or solidify successive layers of material in the regions of the build platform, in the process of building MSODAQ parts or other products.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
controlling an additive manufacturing system to fabricate a three-dimensional (3D) structure using successive layers of material, wherein the additive manufacturing system comprises:
a build platform having a first region, a second region, and an overlapping third region between the first and second regions; and
multiple sources configured to build the successive layers of material in the first, second, and third regions of the build platform;
wherein controlling the additive manufacturing system comprises controlling the additive manufacturing system to build first, second, and third portions of the 3D structure respectively within the first, second, and third regions of the build platform;
wherein each of the first, second, and third portions of the 3D structure comprises (i) one or more test features that are common to the first, second, and third portions of the 3D structure and (ii) a substrate onto or into which the one or more common test features are formed; and
wherein controlling the additive manufacturing system to build the first, second, and third portions of the 3D structure comprises:
controlling a first source calibrated to operate in the first region;
controlling a second source calibrated to operate in the second region, the second region outside the first region; and
controlling the first source and the second source calibrated to operate in the overlapping third region.

2. The method of claim 1, wherein:
the first and third portions of the 3D structure are formed as a unitary structure within the first and third regions of the build platform; and
the second portion of the 3D structure is formed as a discrete component configured to fit together with the third portion of the 3D structure.

3. The method of claim 1, wherein the first, second, and third portions of the 3D structure are formed as a unitary structure within the first, second, and third regions of the build platform.

4. The method of claim 3, wherein:
the build platform further has a fourth region and an overlapping fifth region between the first and fourth regions;
the multiple sources are configured to build the successive layers of material in the first, second, third, fourth, and fifth regions of the build platform; and
the method further comprises controlling the additive manufacturing system to build a second 3D structure, the second 3D structure formed as a second unitary structure within the first, fourth, and fifth regions of the build platform.

5. The method of claim 1, wherein the one or more test features comprise at least one of: one or more pins, one or more walls, one or more vertical holes, one or more horizontal holes, one or more concentric cylinders, one or more semi-spheres, and one or more raised dots.

6. The method of claim 1, wherein the one or more test features comprise multiple overhangs including:
one or more boss overhangs; and
one or more acute-angled downskin overhangs.

7. The method of claim 1, wherein the one or more test features comprise one or more acute-angled upskin surfaces.

8. An apparatus comprising:
at least one processor configured to control an additive manufacturing system in order to fabricate a three-dimensional (3D) structure using successive layers of material, wherein the additive manufacturing system comprises:
a build platform having a first region, a second region, and an overlapping third region between the first and second regions; and
multiple sources configured to build the successive layers of material in the first, second, and third regions of the build platform;
wherein, to control the additive manufacturing system, the at least one processor is configured to cause the additive manufacturing system to build first, second, and third portions of the 3D structure respectively within the first, second, and third regions of the build platform such that each of the first, second, and third portions of the 3D structure comprises (i) one or more test features that are common to the first, second, and third portions of the 3D structure and (ii) a substrate onto or into which the one or more common test features are formed; and wherein, to cause the additive manufacturing system to build the first, second, and third portions of the 3D structure, the at least one processor is configured to:
control a first source calibrated to operate in the first region;
control a second source calibrated to operate in the second region, the second region outside the first region; and
control the first source and the second source calibrated to operate in the overlapping third region.

9. The apparatus of claim 8, wherein:
the at least one processor is configured to control the additive manufacturing system such that the first and third portions of the 3D structure are formed as a unitary structure within the first and third regions of the build platform; and
the at least one processor is configured to control the additive manufacturing system such that the second portion of the 3D structure is formed as a discrete component configured to fit together with the third portion of the 3D structure.

10. The apparatus of claim 8, wherein the at least one processor is configured to control the additive manufacturing system such that the first, second, and third portions of the 3D structure are formed as a unitary structure within the first, second, and third regions of the build platform.

11. The apparatus of claim 10, wherein:
the build platform further has a fourth region and an overlapping fifth region between the first and fourth regions;
the multiple sources are configured to build the successive layers of material in the first, second, third, fourth, and fifth regions of the build platform; and
the at least one processor is further configured to control the additive manufacturing system in order to build a second 3D structure such that the second 3D structure is formed as a second unitary structure within the first, fourth, and fifth regions of the build platform.

12. The apparatus of claim 8, wherein the one or more test features comprise at least one of: one or more pins, one or more walls, one or more vertical holes, one or more horizontal holes, one or more concentric cylinders, one or more semi-spheres, and one or more raised dots.

13. The apparatus of claim 8, wherein the one or more test features comprise multiple overhangs including:
one or more boss overhangs; and
one or more acute-angled downskin overhangs.

14. The apparatus of claim 8, wherein the one or more test features comprise one or more acute-angled upskin surfaces.

15. A non-transitory computer-readable medium containing instructions that when executed cause at least one processor to:
control an additive manufacturing system in order to fabricate a three-dimensional (3D) structure using successive layers of material, wherein the additive manufacturing system comprises:
a build platform having a first region, a second region, and an overlapping third region between the first and second regions; and
multiple sources configured to build the successive layers of material in the first, second, and third regions of the build platform;

wherein the instructions that cause the at least one processor to control the additive manufacturing system comprise instructions that cause the at least one processor to cause the additive manufacturing system to build first, second, and third portions of the 3D structure respectively within the first, second, and third regions of the build platform such that each of the first, second, and third portions of the 3D structure comprises (i) one or more test features that are common to the first, second, and third portions of the 3D structure and (ii) a substrate onto or into which the one or more common test features are formed; and wherein the instructions that cause the at least one processor to cause the additive manufacturing system to build the first, second, and third portions of the 3D structure comprise instructions that cause the at least one processor to:
control a first source calibrated to operate in the first region;
control a second source calibrated to operate in the second region, the second region outside the first region; and
control the first source and the second source calibrated to operate in the overlapping third region.

16. The non-transitory computer-readable medium of claim 15, wherein:
the instructions when executed cause the at least one processor to control the additive manufacturing system such that the first and third portions of the 3D structure are formed as a unitary structure within the first and third regions of the build platform; and
the instructions when executed cause the at least one processor to control the additive manufacturing system such that the second portion of the 3D structure is formed as a discrete component configured to fit together with the third portion of the 3D structure.

17. The non-transitory computer-readable medium of claim 15, wherein the instructions when executed cause the at least one processor to control the additive manufacturing system such that the first, second, and third portions of the 3D structure are formed as a unitary structure within the first, second, and third regions of the build platform.

18. The non-transitory computer-readable medium of claim 17, wherein:
the build platform further has a fourth region and an overlapping fifth region between the first and fourth regions;
the multiple sources are configured to build the successive layers of material in the first, second, third, fourth, and fifth regions of the build platform; and
the instructions when executed further cause the at least one processor to control the additive manufacturing system in order to build a second 3D structure such that the second 3D structure is formed as a second unitary structure within the first, fourth, and fifth regions of the build platform.

19. The non-transitory computer-readable medium of claim 15, wherein the one or more test features comprise at least one of: one or more pins, one or more walls, one or more vertical holes, one or more horizontal holes, one or more concentric cylinders, one or more semi-spheres, one or more raised dots, and one or more acute-angled upskin surfaces.

20. The non-transitory computer-readable medium of claim 15, wherein the one or more test features comprise multiple overhangs including:
   one or more boss overhangs; and
   one or more acute-angled downskin overhangs.

21. The apparatus of claim 8, wherein:
   to control the first source calibrated to operate in the first region, the at least one processor is configured to control the first source as a non-overlapping source to build a first test feature;
   to control the first source and the second source calibrated to operate in the overlapping third region, the at least one processor is configured to control the first source and the second source as overlapping sources to build a second test feature; and
   the first test feature and the second test feature are comparison test features.

\* \* \* \* \*